United States Patent
Chiba et al.

(10) Patent No.: US 12,194,984 B2
(45) Date of Patent: Jan. 14, 2025

(54) DRIVE CONTROL APPARATUS FOR ELECTRIC VEHICLE

(71) Applicant: SUBARU CORPORATION, Tokyo (JP)

(72) Inventors: Naoto Chiba, Tokyo (JP); Atsushi Doki, Tokyo (JP); Keigo Yamada, Tokyo (JP); Yuichiro Higashiji, Tokyo (JP); Takuya Yano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/008,013

(22) PCT Filed: Jul. 5, 2021

(86) PCT No.: PCT/JP2021/025261
§ 371 (c)(1),
(2) Date: Dec. 2, 2022

(87) PCT Pub. No.: WO2023/281560
PCT Pub. Date: Jan. 12, 2023

(65) Prior Publication Data
US 2024/0300476 A1 Sep. 12, 2024

(51) Int. Cl.
*B60W 20/50* (2016.01)
*B60W 10/02* (2006.01)
(Continued)

(52) U.S. Cl.
CPC ............ *B60W 20/50* (2013.01); *B60W 10/02* (2013.01); *B60W 10/06* (2013.01); *B60W 10/08* (2013.01);
(Continued)

(58) Field of Classification Search
CPC ...... B60W 10/06; B60W 10/08; B60W 10/02; B60W 10/107; B60W 20/50; B60W 20/40;
(Continued)

(56) References Cited

U.S. PATENT DOCUMENTS

2013/0271051 A1* 10/2013 Goto ..................... B60L 3/0038
318/400.26
2018/0281596 A1* 10/2018 Arakawa .................. H02P 6/18
(Continued)

FOREIGN PATENT DOCUMENTS

JP 2017-034762 A 2/2017

*Primary Examiner* — Timothy Hannon
(74) *Attorney, Agent, or Firm* — Rimon P.C.

(57) ABSTRACT

A drive control apparatus for an electric vehicle includes a controller that controls an engine, a traveling motor, a transmission, and an output clutch. The controller estimates the rotation angle of the motor by a first estimation method and controls the motor on the basis of the estimated angle. The estimation method is executable when the rotation speed of the motor is a threshold or higher. When a rotation angle sensor for the motor is in an abnormal state and a specific driving state is present, the controller controls one or more of the engine, the transmission, and the output clutch differently from when the sensor is in a normal state, and thereby maintains the rotation speed at the threshold or higher. The specific driving state is a state in which the rotation speed is lower than the threshold under the control when the sensor is in the normal state.

8 Claims, 3 Drawing Sheets

(51) Int. Cl.
  *B60W 10/06* (2006.01)
  *B60W 10/08* (2006.01)
  *B60W 20/40* (2016.01)
  *B60W 10/107* (2012.01)

(52) U.S. Cl.
  CPC ........... *B60W 20/40* (2013.01); *B60W 10/107* (2013.01); *B60W 2510/0685* (2013.01); *B60W 2510/081* (2013.01); *B60W 2710/021* (2013.01); *B60W 2710/1011* (2013.01)

(58) Field of Classification Search
  CPC ... B60W 2510/081; B60W 2510/0685; B60W 2710/021; B60W 2710/081; B60W 2710/1011
  See application file for complete search history.

(56) References Cited

U.S. PATENT DOCUMENTS

2019/0344671 A1\* 11/2019 Shin ........................ B60K 6/20
2023/0322205 A1\* 10/2023 Kwak ................... B60W 10/06

\* cited by examiner

DRIVE CONTROL APPARATUS FOR ELECTRIC VEHICLE

CROSS REFERENCE TO RELATED APPLICATIONS

This application is the U.S. National Phase under 35 U.S.C. § 371 of International Application No. PCT/JP2021/025261, filed on Jul. 5, 2021, the entire contents of each are hereby incorporated by reference.

TECHNICAL FIELD

The invention relates to a drive control apparatus for an electric vehicle.

BACKGROUND ART

PTL 1 discloses a controller that is able to drive a motor by a first sensorless control and a second sensorless control even in a case where a sensor that detects a rotation angle of the motor is in an abnormal state. In the first sensorless control, the controller performs a drive control of the motor on the basis of a result of estimation of a rotation angle using an induced voltage of the motor. In the second sensorless control, the controller performs the drive control of the motor on the basis of a result of estimation of the rotation angle using saliency of a rotor. Upon detecting the abnormal state of the sensor, the controller performs switching between the first sensorless control and the second sensorless control depending on the rotation speed of the motor.

CITATION LIST

Patent Literature

Patent Literature 1: Japanese Unexamined Patent Application Publication No. 2017-034762

SUMMARY OF INVENTION

Problem to be Solved by the Invention

In general, it is difficult to achieve high accuracy in estimation by a method that allows for estimation of a rotation angle even in a case where a rotation speed of a motor is low, for example, by an estimation method using saliency of a rotor or by an estimation method using a magnetic saturation phenomenon of the motor. In terms of an electric vehicle, there is an issue that if a traveling motor is driven by an estimation method having low accuracy, a rotation speed and output torque of the traveling motor are biased and this may give a feeling of strangeness to a passenger of the vehicle.

It is an object of the invention to provide a drive control apparatus for an electric vehicle that makes it possible to achieve traveling causing less feeling of strangeness even in a case where a rotation angle sensor that detects a rotation angle of a traveling motor comes into an abnormal state.

Means for Solving the Problem

A drive control apparatus for an electric vehicle according to an aspect of the invention is a drive control apparatus for an electric vehicle to be mounted on the electric vehicle. The electric vehicle includes a driving wheel, an engine that is an internal combustion engine, a traveling motor configured to generate power for traveling, a transmission configured to shift motion transmitted from the engine, and an output clutch configured to cut a path of power transmission to the driving wheel. The electric vehicle is configured to output power from the engine and the traveling motor to the driving wheel via the transmission and the output clutch. The drive control apparatus includes a rotation angle sensor and a controller. The rotation angle sensor is configured to detect a rotation angle of the traveling motor. The controller is configured to control the engine, the traveling motor, the transmission, and the output clutch. The controller is configured to estimate the rotation angle by a first estimation method and control the traveling motor on the basis of the estimated rotation angle. The first estimation method is executable in a case where a rotation speed of the traveling motor is a threshold or higher. The controller is configured to control, in a case where the rotation angle sensor is in an abnormal state and a specific driving state is present, one or more of the engine, the transmission, and the output clutch in a manner different from a manner under a control in a case where the rotation angle sensor is in a normal state, and thereby maintain the rotation speed of the traveling motor at the threshold or higher. The specific driving state is a state in which the rotation speed of the traveling motor is to be lower than the threshold under the control in the case where the rotation angle sensor is in the normal state.

Effects of the Invention

According to the above-described aspect of the invention, in a case where a rotation angle sensor for a traveling motor comes into an abnormal state, a control by a controller increases a period in which a rotation speed of the traveling motor is maintained at a threshold or higher, as compared with a case where the rotation angle sensor is in a normal state. Thus, a period in which the traveling motor is controllable on the basis of the rotation angle estimated by a first estimation method increases. Accordingly, in the case where the rotation angle sensor is in the abnormal state, the controller is able to drive the traveling motor by the first estimation method that allows for highly accurate estimation and to achieve traveling by power of the traveling motor at many timings. As a result, it is possible to reduce a feeling of strangeness given to a passenger of a vehicle even in the case where the rotation angle sensor comes into the abnormal state.

MODES FOR CARRYING OUT THE INVENTION

Figure 1:
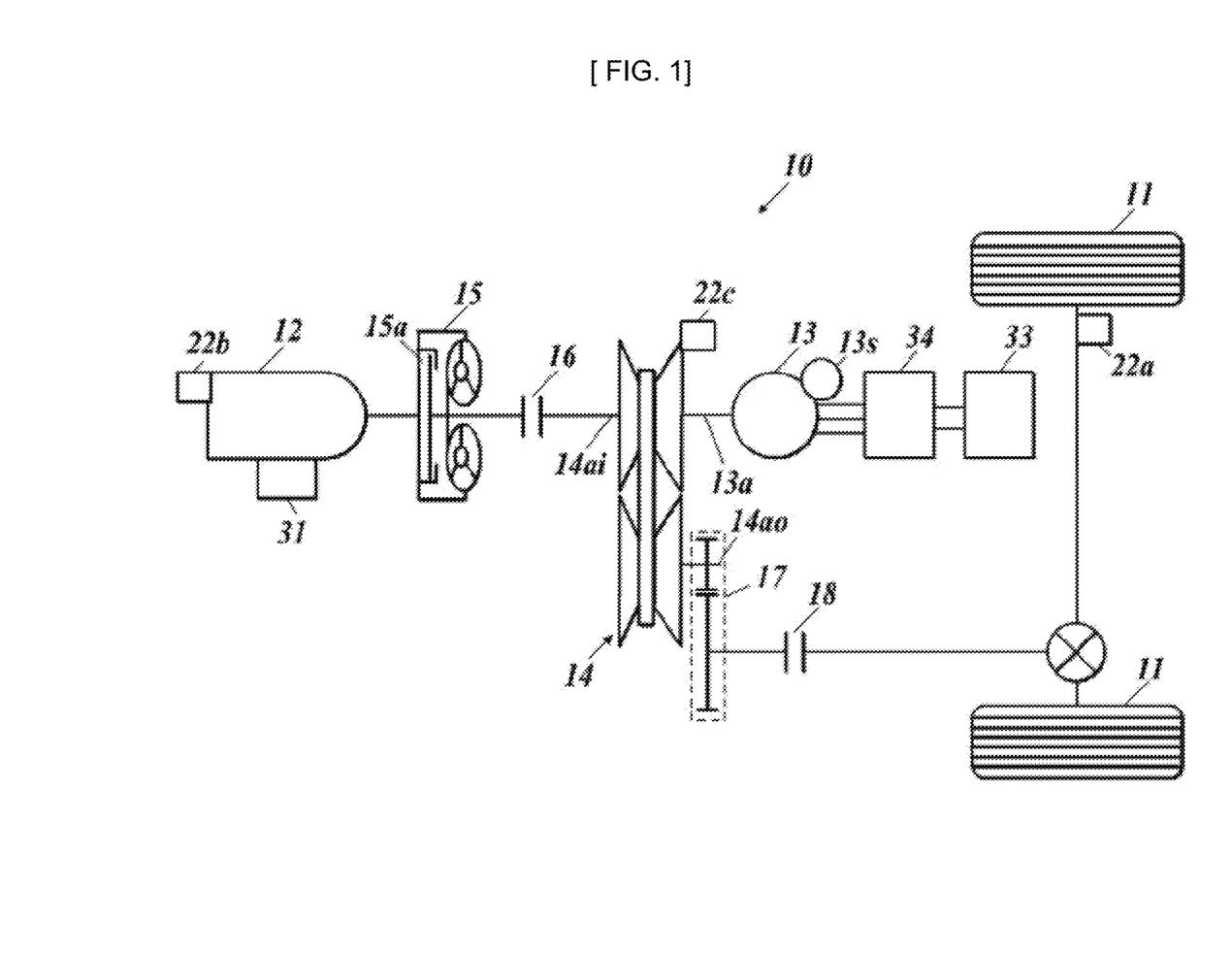
FIG. 1 is a block diagram illustrating an electric vehicle to which a drive control apparatus according to one embodiment of the invention is applied.
Figure 2:
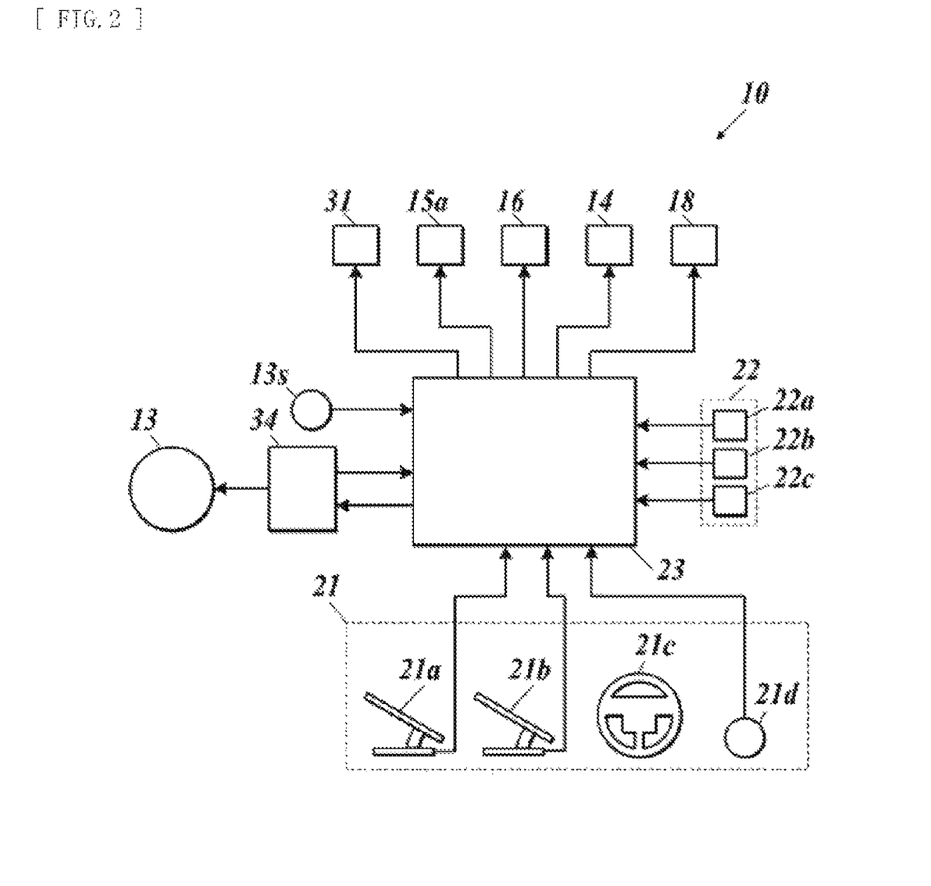
FIG. 2 is a block diagram illustrating a configuration of a control system of the electric vehicle illustrated in FIG. 1.

In the following, some embodiments of the invention are described in detail with reference to the drawings. FIG. 1 is a block diagram illustrating an electric vehicle to which a drive control apparatus according to an embodiment of the invention is applied. FIG. 2 is a block diagram illustrating a configuration of a control system of the electric vehicle illustrated in FIG. 1.

The electric vehicle 10 illustrated in FIG. 1 includes driving wheels 11, an engine 12, a traveling motor 13, and a transmission 14. The engine 12 is an internal combustion engine. The traveling motor 13 generates power for traveling. The transmission 14 shifts and transmits a rotary motion. The electric vehicle 10 further includes a torque converter 15, a separate clutch 16, a gear mechanism 17, and an output clutch 18. The torque converter 15 and the separate clutch 16 are positioned on a power transmission path between the engine 12 and the transmission 14. The gear mechanism 17 and the output clutch 18 are positioned on a power transmission path between the transmission 14 and the driving wheels 11.

The torque converter 15 increases output torque by generating a difference between a rotation speed of an input shaft and a rotation speed of an output shaft. The torque converter 15 is equipped with a lock-up clutch mechanism, and is able to switch the state of the input shaft and the output shaft to an engaged state. When an increase in torque is unnecessary, a loss caused in the torque converter 15 is reducible by bringing the lock-up clutch mechanism into the engaged state.

The separate clutch 16 is a clutch adapted to decoupling the engine 12 from the power transmission path in a case where traveling is achieved only by the power of the traveling motor 13.

The transmission 14 shifts a rotation speed of an input shaft 14*ai* and outputs it to an output shaft 14*ao*. The transmission 14 may have a configuration that allows for continuous variation in speed ratio, or may have a configuration that allows for stepwise switching of the speed ratio. Herein, it is defined that "speed ratio=reduction ratio=rotation speed of input shaft 14*ai*/rotation speed of output shaft 14*ao*". That is, the speed ratio of 1 or greater means reduction in speed, the speed ratio of less than 1 means increase in speed, and the greater speed ratio means the greater reduction ratio.

The gear mechanism 17 shifts the rotation speed at a constant speed ratio. The gear mechanism 17 receives power from the output shaft 14*ao* of the transmission 14 and outputs the power to the output clutch 18. The gear mechanism 17 may be omitted.

The output clutch 18 is controllable among a disengaged state, an engaged state, and a half-engaged state. By being disengaged, the output clutch 18 is able to cut the power transmission path between the transmission 14 and the driving wheels 11. The disengaged state refers to a state in which little power is transmitted, and the engaged state refers to a state in which almost 100% power is transmitted. The half-engaged state refers to a state in which a rate of transmitted power varies between 0% and 100% depending on the degree of engagement.

The traveling motor 13 is an electric motor that generates power by electric power. The traveling motor 13 includes a rotor, a stator, a motor shaft 13*a*, and multiple phases of coils. The rotor is driven to rotate. The stator exerts a magnetic effect on the rotor. The motor shaft 13*a* is coupled to the rotor. The multiple phases of coils generate the magnetic effect between the rotor and the stator. The traveling motor 13 outputs power from the motor shaft 13*a*. The traveling motor 13 further includes a rotation angle sensor 13*s* that detects a rotation angle of the rotor.

The motor shaft 13*a* of the traveling motor 13 is coupled to the input shaft 14*ai* of the transmission 14. Accordingly, it is possible to output power from the traveling motor 13 to the driving wheels 11 via the transmission 14 and the output clutch 18. It is to be noted that the motor shaft 13*a* of the traveling motor 13 may be coupled to the input shaft 14*ai* of the transmission 14 via a gear mechanism.

The rotation angle sensor 13*s* is, for example, a resolver, an encoder, or the like, and detects the rotation angle of the rotor. The rotation angle of the rotor may be referred to, in other words, as a rotation angle of the motor shaft 13*a*. Hereinafter, the rotation angle of the rotor is simply referred to as the "rotation angle". The traveling motor 13 is caused to perform a power running operation or a regenerative operation by varying a current flowing through the coils in accordance with the rotation angle.

As illustrated in FIG. 2, the electric vehicle 10 further includes a driving operation unit 21, a sensor group 22, and a controller 23. The driving operation unit 21 is to be operated by a driver. The sensor group 22 detects a vehicle state. The controller 23 receives an output from the sensor group 22 and an operation signal from the driving operation unit 21 to control each unit.

The driving operation unit 21 includes an acceleration operation unit (an accelerator pedal, etc.) 21*a* to perform an acceleration operation, a brake operation unit (a brake pedal, etc.) 21*b* to perform a brake operation, and a steering unit (a steering wheel, etc.) 21*c* to perform a steering operation. The driving operation unit 21 may further include a start operation unit (a start button, a key cylinder, etc.) 21*d* to start the electric vehicle 10. Operation signals from the acceleration operation unit 21*a* and the brake operation unit 21*b* are supplied to the controller 23.

The sensor group 22 includes a vehicle speed sensor 22*a*, an engine rotation speed sensor 22*b*, and a motor rotation speed sensor 22*c*. The vehicle speed sensor 22*a* detects a vehicle speed from a wheel speed or the like. The engine rotation speed sensor 22*b* detects a rotation speed of the engine 12. The motor rotation speed sensor 22*c* detects a rotation speed of the traveling motor 13. A detection signal of the sensor group 22 is supplied to the controller 23.

The electric vehicle 10 further includes accessories 31, a battery 33 (FIG. 1), and an inverter 34. The accessories 31 are adapted to driving the engine 12. The battery 33 stores electric power to be used by the traveling motor 13. The inverter 34 converts electric power between the battery 33 and the traveling motor 13. The accessories 31 and the inverter 34 are controlled by the controller 23. It is to be noted that the inverter 34, the rotation angle sensor 13*s* of the traveling motor 13, and the controller 23 correspond to an example of a drive control apparatus according to the invention.

The controller 23 is an ECU (Electronic Control Unit). The controller 23 may be a single ECU or may have a configuration including a plurality of ECUs that cooperate with each other through communication. The controller 23 controls the engine 12, the traveling motor 13, the speed ratio of the transmission 14, the lock-up mechanism 15*a* of the torque converter 15, the engagement state of the separate clutch 16, and the engagement state of the output clutch 18 depending on the driving operation and the vehicle state. More specifically, the controller 23 controls the accessories 31 to thereby control the output torque or the rotation speed of the engine 12. In addition, the controller 23 causes a plurality of hydraulic cylinders by means of a hydraulic circuit to thereby control the speed ratio of the transmission 14, the engagement state of the lock-up mechanism 15*a* of the torque converter 15, the engagement state of the separate clutch 16, and the engagement state of the output clutch 18. An electric actuator may be employed in place of the hydraulic cylinders.

In addition, the controller 23 performs a vector control according to the rotation angle to thereby cause the traveling motor 13 to perform the power running operation and the regenerative operation. In other words, the controller 23 controls a current flowing through each of the coils of the traveling motor 13 on the basis of the rotation angle of the traveling motor 13 via the inverter 34, to thereby control the output torque or the rotation speed of the traveling motor 13. While the system of the electric vehicle 10 is activated, the controller 23 repeatedly performs an abnormal-state check process for the rotation angle sensor 13s of the traveling motor 13. Further, if the rotation angle sensor 13s is not in an abnormal state, the controller 23 executes the vector control of the traveling motor 13 on the basis of the rotation angle detected by the rotation angle sensor 13s, either in a case where the traveling motor 13 is stopped or in a case where the traveling motor 13 is rotating. In contrast, if the rotation angle sensor 13s is in the abnormal state, the controller 23 estimates the rotation angle of the traveling motor 13 by a plurality of estimation methods including a first estimation method and a second estimation method, and executes the vector control of the traveling motor 13 on the basis of the estimated rotation angle. The vector control based on the estimated rotation angle is referred to as a "sensorless control".

It is to be noted that a configuration may be employed in which an ECU other than the controller 23 performs the abnormal-state check process for the rotation angle sensor 13s and, in a case where rotation angle sensor 13s is in the abnormal state, that ECU may notify the controller 23 of a result of the abnormal-state check.

The traveling motor 13 or the inverter 34 is provided with a sensor that detects a voltage and a current of each phase of the coils of the traveling motor 13. An output from the sensor is supplied to the controller 23. The controller 23 is configured to estimate the rotation angle of the traveling motor 13 by the first estimation method or the second estimation method on the basis of the output from the sensor.

The first estimation method is a method that allows for estimation of the rotation angle on a condition that the rotation speed of the traveling motor 13 is a threshold vth or higher. Using the first estimation method on such a condition makes it possible to achieve relatively high accuracy in estimating the rotation angle. As the first estimation method, for example, a method of estimating the rotation angle in accordance with a known extended electromotive force (EEFM: Extended Electromotive Force) model is applicable. Here, the threshold vth is a value greater than zero, and may be, for example, a value corresponding to the rotation speed of the traveling motor 13 in a case where the electric vehicle 10 performs normal traveling at a medium speed or higher by driving of the traveling motor 13. In addition, the threshold vth may be a constant value, but may be, for example, a value that varies depending on an operation state of the traveling motor. The threshold vth may be set to the rotation speed of the traveling motor 13 that allows for estimation of the rotation angle with target accuracy. Such a rotation speed may be determined by a test or the like.

The second estimation method is a method that allows for estimation of the rotation angle even in a case where the rotation speed of the traveling motor 13 is lower than the threshold vth including a case where the rotation speed of the traveling motor 13 is zero. The second estimation method allows for estimation even with a low rotation speed; on the other hand, it is difficult to achieve high accuracy in estimation. As the second estimation method, for example, an estimation method using a magnetic saturation phenomenon in the traveling motor 13 (a method in which a pulse voltage is applied to the coils of the traveling motor 13 to detect a current value upon occurrence of the magnetic saturation phenomenon, and the rotation angle is estimated on the basis of the detected current value) is applicable. Alternatively, as the second estimation method, a method of estimating the rotation angle from an inductance value of the coils that varies due to the saliency of the rotor is applicable.

Because the second estimation method has low accuracy in estimation, in a case where the traveling motor 13 is driven by a vector control using the second estimation method and where the power at that time is transmitted to the driving wheels 11, biased torque is transmitted to the driving wheels 11. This may give a feeling of strangeness to a passenger of the electric vehicle 10. To address this, in a case where the rotation angle sensor 13s comes into the abnormal state, the controller 23 controls at least one of the engine 12, the transmission 14, or the output clutch 18 in a manner different from that in a case where the rotation angle sensor 13s is in a normal state. Further, by performing such a control, the controller 23 is able to so control the traveling motor 13 that the above-described feeling of strangeness is reduced.

Next, described is contents of a control to be performed by the controller 23 in the case where the rotation angle sensor 13s is in the normal state and in the case where the rotation angle sensor 13s is in the abnormal state. In the following description, a power transmission unit before the transmission 14 is referred to as an input transmission unit, and a power transmission unit after the transmission 14 is referred to as an output transmission unit. The input transmission unit specifically includes the torque converter 15 and the separate clutch 16. The output transmission unit specifically includes the output clutch 18.

<Control in Case where Rotation Angle Sensor is in Normal State>

Next, described is the control in the case where the rotation angle sensor 13s is in the normal state.

In the case where the rotation angle sensor 13s is in the normal state, as described in Control table 1 below, the controller 23 controls each unit of the electric vehicle 10 to thereby achieve traveling according to the driving operation performed by the driver or the like, the vehicle state, or both.

TABLE 1

| | | Control table 1 | | | | | | |
|---|---|---|---|---|---|---|---|---|
| | | Input transmission unit | | | Speed ratio | | Motor shaft | Output |
| | Driving state | Torque converter | Separate clutch | Engine | (Reduction ratio) | Traveling motor | rotation speed nMot | transmission unit |
| State 1 | High-speed traveling | Engaged | Engaged | Operating | Medium⇔Small | Power running/ Regenerative/ Field weakening | vth < nMot | Engaged |

TABLE 1-continued

Control table 1

| | Driving state | Input transmission unit | | | Speed ratio (Reduction ratio) | Traveling motor | Motor shaft rotation speed nMot | Output transmission unit |
| --- | --- | --- | --- | --- | --- | --- | --- | --- |
| | | Torque converter | Separate clutch | Engine | | | | |
| State 2 | Low-medium-speed traveling | Engaged/Differential rotation | Engaged | Operating | Medium | Power running/Regenerative | nMot < vth ↕ vth < nMot | Engaged |
| State 3A | Start traveling by motor | Engaged/Differential rotation | Disengaged | Stopped/Operating | Great | Power running (Low speed) | nMot < vth | Engaged |
| State 3B | Start traveling by engine | Differential rotation | Engaged | Operating (Low speed) | Great | Power running/Non-controlled | nMot < vth | Engaged |
| State 4 | Vehicle speed of zero | Differential rotation | Engaged/Disengaged | Stopped/Idling | — | Stopped | nMot < vth | Engaged/Disengaged |
| State 5 | Engine start | Differential rotation | Engaged | Start | — | Power running | nMot < vth | Disengaged |

In Control tables 1 and 2, an "engaged" state of the torque converter 15 refers to that the lock-up mechanism 15a is in the engaged state. A "differential rotation" state of the torque converter 15 refers to a state in which the lock-up mechanism 15a is disengaged and a rotational difference is present between the input shaft and the output shaft. An "engaged" state and a "disengaged" state of the output transmission unit refers to an engaged state and a disengaged state of the output clutch 18. "nMot" refers to the rotation speed of the motor shaft 13a of the traveling motor 13. "/" means "or" and "a/b" means that a state of either a or b is achieved depending on the situation. A "low-medium speed" refers to a low speed and a medium speed.

The following is the control to be performed in the case where the rotation angle sensor 13s is in the normal state.

As described in "State 5", in a case where start of the engine 12 is requested when the vehicle is stopped, the controller 23 disengages the output clutch 18, disengages the lock-up mechanism 15a of the torque converter 15, engages the separate clutch 16, and drives the traveling motor 13. Thus, the power of the traveling motor 13 is transmitted to the engine 12 without being transmitted to the driving wheels 11. Further, the controller 23 controls the accessories 31, using the transmitted power as the power to start the engine 12. This allows the engine 12 to start.

As described in "State 4", in a case where the vehicle speed is zero, the controller 23 stops the traveling motor 13. In addition, the controller 23 disengages the lock-up mechanism 15a of the torque converter 15 and stops the engine 12 or causes the engine 12 to idle. In "State 4", the controller 23 may disengage or engage the output clutch 18.

As described in "State 3B", in a case where to start traveling by power of the engine 12 is requested, the controller 23 starts the engine 12 in "State 5", sets the speed ratio of the transmission 14 to great, and engages the output clutch 18. Thus, the power of the engine 12 is transmitted to the driving wheels 11 via the torque converter 15 and the transmission 14. This allows the electric vehicle 10 to start traveling. In "State 3B", the controller 23 may cause the traveling motor 13 to perform power running operation, or may not control the traveling motor 13.

As described in "State 3A", in a case where to start traveling by power of the traveling motor 13 is requested, the controller 23 disengages the separate clutch 16, engages the output clutch 18, sets the speed ratio of the transmission 14 to great, and drives the traveling motor 13. Thus, the power of the traveling motor 13 is transmitted to the driving wheels 11 via the transmission 14. This allows the electric vehicle 10 to start traveling. At this time, the controller 23 may bring the lock-up mechanism 15a of the torque converter 15 into the disengaged state or into the engaged state. In addition, the controller 23 may stop the engine 12 or may cause the engine 12 to idle.

The driving states in "State 3A", "State 3B", "State 4", and "State 5" are each a driving state in which the rotation speed nMot of the motor shaft 13a is lower than the threshold vth. That the rotation speed nMot is lower than the threshold vth refers to that such a rotation speed nMot of the motor shaft 13a does not allow for the use of the first estimation method. The above-described driving state is referred to as a "specific driving state".

As described in "State 2", in a case where the vehicle is traveling at a low-medium speed, the controller 23 drives the engine 12 and the traveling motor 13, brings the separate clutch 16 into the engaged state, and brings the output clutch 18 into the engaged state. Further, the controller 23 performs switching between the disengaged state and the engaged state of the lock-up mechanism 15a of the torque converter 15 on the basis of driving parameters including the vehicle speed. In addition, the controller 23 controls the respective outputs of the engine 12 and the traveling motor 13 and the speed ratio of the transmission 14 on the basis of driving parameters including the acceleration operation and the vehicle speed. The speed ratio is controlled within a medium range. The medium range refers to a range that is smaller than the speed ratio at a time when the vehicle starts traveling and greater than a small speed ratio at a time when the vehicle is traveling at a high speed.

In "State 2", the controller 23 performs switching between the power running operation and the regenerative operation of the traveling motor 13 on the basis of driving parameters including the brake operation, the acceleration operation, and a remaining charge amount of the battery 33. The power running operation performed by the traveling motor 13 makes it possible to add the power of the traveling motor 13 to traveling power (torque assist). The regenerative operation causes breaking to act on the electric vehicle 10, and makes it possible to increase the remaining charge amount of the battery 33.

In "State 2", the rotation speed nMot of the motor shaft 13a becomes lower than the threshold vth (the specific driving state) or becomes the threshold vth or higher depending on the vehicle speed and the speed ratio.

As described in "State 1", when the vehicle is traveling at a high speed, the controller 23 brings the lock-up mechanism 15a of the torque converter 15 into the engaged state, brings the separate clutch 16 and the output clutch 18 into the engaged state, and drives the engine 12. Further, the controller 23 controls the output of the engine 12 and the speed ratio of the transmission 14 on the basis of driving parameters including the acceleration operation and the vehicle speed. When the vehicle is traveling at a high speed, the controller 23 causes the traveling motor 13 to perform the power running operation or the regenerative operation in accordance with a request for torque assist or regenerative braking. Furthermore, when the vehicle is traveling at a high speed, the motor shaft 13a rotates at a high speed regardless of the operation state of the traveling motor 13. Therefore, in a case where the torque assist or the regenerative braking is not requested, the controller 23 performs a field weakening control of the traveling motor 13. The field weakening control makes it possible to decrease the induced voltage generated in the traveling motor 13 to thereby reduce the loss caused in the traveling motor 13.

In "State 1", the rotation speed nMot of the motor shaft 13a is the threshold vth or higher.

<Control in Case where Rotation Angle Sensor is in Abnormal State>

In the case where the rotation angle sensor 13s is in the abnormal state, as described in Control table 2 below, the controller 23 controls each unit of the electric vehicle 10 to thereby achieve traveling according to the driving operation performed by the driver or the like, the vehicle state, or both.

TABLE 2

Control table 2

| | | Input transmission unit | | |
|---|---|---|---|---|
| | Driving state | Torque converter | Separate clutch | Engine |
| State 1 | High-speed traveling | Engaged | Engaged | Operating |
| State 2A | Low-medium-speed traveling | Engaged/ Differential rotation | Engaged | Operating Medium speed |
| State 2B | Low-medium-speed traveling (Only engine ↕ Resume traveling motor) | Differential rotation ↕ Engaged | Engaged | Operating Low speed⇔Medium speed ↕ Medium speed |
| State 3 | Start traveling | Engaged/ Differential rotation | Engaged/ Disengaged | Operating |
| State 4 | Vehicle speed of zero | Engaged/ Differential rotation | Engaged/ Disengaged | Idling |
| State 5 | Engine start | Differential rotation | Engaged | Start |

| | Speed ratio (Reduction ratio) | Traveling motor | Motor shaft rotation speed nMot | Output transmission unit |
|---|---|---|---|---|
| State 1 | Medium⇔Small | Power running/ Regenerative/ Field weakening (Sensorless control by first estimation method) | vth ≤ nMot | Engaged |
| State 2A | Great | Power running/ Regenerative (Sensorless control by first estimation method) | Maintain vth ≤ nMot | Engaged |
| State 2B | Medium ↕ Great | Non-controlled ↕ Power running/ Regenerative (Sensorless control by first estimation method) | nMot < vth ⇔ vth ≤ nMot ↕ vth ≤ nMot | Engaged |
| State 3 | Great | Power running (Sensorless control by first estimation method) | Maintain vth ≤ nMot | Disengaged ↓ Half-engaged state |
| State 4 | — | Power running (Sensorless control by second estimation method⇒ first estimation method) | nMot < vth ↓ vth ≤ nMot | Disengaged |

TABLE 2-continued

Control table 2

| State 5 | — | Power running (Sensorless control by second estimation method) | nMot < vth | Disengaged |

The following is the control to be performed in the case where the rotation angle sensor 13s is in the abnormal state.

As described in "State 1", in a case where the vehicle is traveling at a high speed, the controller 23 controls each unit as in the control in the case where the rotation angle sensor 13s is in the normal state. That is, the controller 23 brings the lock-up mechanism 15a of the torque converter 15 into the engaged state and brings the separate clutch 16 and the output clutch 18 into the engaged state. In addition, the controller 23 controls the respective outputs of the engine 12 and the traveling motor 13 and the speed ratio of the transmission 14 on the basis of driving parameters including the acceleration operation and the vehicle speed. In a case where the torque assist and the regenerative operation by the traveling motor 13 are unnecessary, the controller 23 performs the field weakening control of the traveling motor 13.

In "State 1", because the rotation speed nMot of the motor shaft 13a does not fall below the threshold vth, the controller 23 executes the power running operation, the regenerative operation, or the field weakening control of the traveling motor 13 by the sensorless control using the first estimation method.

While the control for "State 1" is performed, the vehicle speed decreases due to the deceleration operation, which causes switching to a control for low-medium-speed traveling in "State 2A".

As described in "State 2A", in a case where the vehicle is traveling at the low-medium speed, the controller 23 engages the separate clutch 16, engages the output clutch 18, and performs switching between the disengaged state and the engaged state of the lock-up mechanism 15a of the torque converter 15 on the basis of driving parameters including the vehicle speed. Further, the controller 23 controls the respective outputs of the engine 12 and the traveling motor 13 and the speed ratio of the transmission 14 on the basis of driving parameters including the acceleration operation and the vehicle speed. However, in a case where the vehicle speed decreases, the controller 23 so controls the transmission 14 that the speed ratio becomes greater than that under the control in the case of the normal state, thus preventing the rotation speed of the traveling motor 13 from falling below the threshold vth due to a decrease in the rotation speed of the input shaft 14ai of the transmission 14. In addition, the controller 23 so controls the engine 12 and the traveling motor 13 that the rotation speed becomes higher than that under the control in the case of the normal state. By such a control, the controller 23 achieves a low vehicle speed while maintaining the rotation speed nMot of the motor shaft 13a at the threshold vth or higher.

Further, in a situation of "State 2A" described above, the controller 23 causes the traveling motor 13 to perform the power running operation if the torque assist is requested, and the controller 23 causes the traveling motor 13 to perform the regenerative operation if the regenerative braking is requested. In "State 2A", because the rotation speed nMot of the motor shaft 13a is maintained at the threshold vth or higher, the controller 23 causes the traveling motor 13 to perform the power running operation or the regenerative operation by the sensorless control using the first estimation method.

According to the control in "State 2A", even in the case where the rotation angle sensor 13s is in the abnormal state, the controller 23 is able to cause, on the basis of the result of the highly accurate estimation of the rotation angle by the first estimation method, the traveling motor 13 to perform the power running operation to meet the request for the torque assist. Further, the controller 23 is able to cause the traveling motor 13 to perform the regenerative operation to meet the request for the regenerative braking. The first estimation method makes it possible to obtain the result of the estimation of the rotation angle with high accuracy. Accordingly, upon performing the sensorless control of the traveling motor 13, the bias on the rotation speed and the torque of the traveling motor 13 with respect to the target value is reduced. This makes it possible to reduce the feeling of strangeness given to the passenger of the electric vehicle 10.

While the control in "State 2A" is performed, the vehicle speed increases due to the acceleration operation or the like, which causes switching to the control for the high-speed traveling in "State 1". In addition, while the control in "State 2A" is performed, the vehicle speed becomes almost zero due to the deceleration operation or the like, which causes switching to the control for the vehicle speed of zero in "State 4".

"State 2B" represents a driving state in which switching is performed between a first traveling state in which the traveling motor 13 is under no control and a second traveling state in which the traveling motor 13 is driven for traveling. In the first traveling state, the traveling motor 13 is under no control and the electric vehicle 10 travels only with the power of the engine 12. In the second traveling state, the electric vehicle 10 travels with the power of the traveling motor 13 and the power of the engine 12. When non-control of the traveling motor 13 is requested, the controller 23 stops controlling the traveling motor 13 while maintaining the driving of the engine 12. In a case where the traveling motor 13 is under no control and the vehicle travels at the low-medium speed, the controller 23 controls the output of the engine 12 in accordance with the driving operation and the vehicle state. In this case, the controller 23 may disengage the lock-up mechanism 15a of the torque converter 15 and controls the speed ratio of the transmission 14 to be equivalent to that under the control in the case of the normal state.

In a case where the power running operation or the regenerative operation of the traveling motor 13 is requested while the vehicle is traveling at the low-medium speed in "State 2B", the controller 23 engages the lock-up mechanism 15a of the torque converter 15 and maintains the respective engaged states of the separate clutch 16 and the output clutch 18. In addition, the controller 23 causes the rotation speed of the engine 12 to be higher than that under the control in the case of the normal state, and causes the speed ratio of the transmission 14 to be greater than that under the control in the case of the normal state. Such a control makes it possible to vary the rotation speed nMot of the motor shaft 13a of the traveling motor 13 from a value less than the threshold vth to a value of the threshold vth or higher, while maintaining the vehicle speed according to the driving operation. Thereafter, by the sensorless control using the first estimation method, the controller 23 drives the traveling motor 13 and causes the traveling motor 13 to perform the power running operation or the regenerative operation.

According to the control in "State 2B", in the case where the rotation angle sensor 13s is in the abnormal state, it is possible to put the traveling motor 13 under no control also while the vehicle is traveling at the low-medium speed. Further, in a case of resuming the driving of the traveling motor 13, it is possible to drive the traveling motor 13 by the sensorless control using the first estimation method. Accordingly, the controller 23 is able to drive the traveling motor 13 with use of the result of the highly accurate estimation of the rotation angle. This makes it possible to reduce the bias caused in the rotation speed and the torque of the traveling motor 13 with respect to the target values. Accordingly, it is possible to reduce the feeling of strangeness given to the passenger of the electric vehicle 10.

As described in "State 5", in a case where the start of the engine 12 is requested while the vehicle speed is zero, the controller 23 disengages the output clutch 18, engages the separate clutch 16, and disengages the lock-up mechanism 15a of the torque converter 15. Further, the controller 23 drives the traveling motor 13 by the sensorless control using the second estimation method. Such driving causes the traveling motor 13 to supply the engine 12 with the power for starting. Therefore, the controller 23 controls the accessories 31 to thereby start the engine 12.

In "State 5", because the controller 23 drives the traveling motor 13 by the second estimation method having low accuracy in estimating the rotation angle, the torque or the rotation speed of the traveling motor 13 is sometimes biased with respect to the target value. However, upon driving the traveling motor 13 by the second estimation method, the disengaged state of the output clutch 18 prevents the biased torque from being transmitted to the driving wheels 11. Accordingly, it is possible to reduce the feeling of strangeness given to the passenger of the electric vehicle 10.

As described in "State 4", in a case where the engine 12 has already been started and where the vehicle speed is zero, the controller 23 increases the rotation speed of the traveling motor 13 while maintaining the disengaged state of the output clutch 18, to thereby vary the rotation speed nMot of the motor shaft 13a from a value less than the threshold vth to a value of the threshold vth or greater. Upon increasing the rotation speed, the controller 23 controls the rotation speed of the traveling motor 13 by the sensorless control using the second estimation method. Further, when the rotation speed nMot reaches the threshold vth or higher, the controller 23 performs switching to the sensorless control using the first estimation method, and thereafter, so maintains the driving of the traveling motor 13 that the rotation speed nMot does not fall below the threshold vth. In "State 4", the controller 23 maintains the driving of the engine 12. In this case, the controller 23 may engage or disengage the separate clutch, and may engage or disengage the lock-up mechanism 15a of the torque converter 15.

The control for start traveling in "State 3" is to be executed after the engine 12 is driven by the control in "State 5" described above and the rotation speed nMot of the motor shaft 13a becomes the threshold vth or higher by the control in "State 4". In a case where the start of traveling is requested, the controller 23 sets the speed ratio of the transmission 14 to great and causes the traveling motor 13 to perform the power running operation by the sensorless control using the first estimation method. Further, the controller 23 switches the state of the output clutch 18 from the disengaged state to the half-engaged state. Such a control makes it possible to transmit the torque from the traveling motor 13 to the driving wheels 11 via the output clutch 18 in the half-engaged state to thereby cause the electric vehicle 10 to start traveling, while maintaining the rotation speed nMot of the motor shaft 13a at the threshold vth or higher.

Upon starting of the traveling in "State 3", the controller 23 may disengage the separate clutch 16 and does not have to use the power of the engine 12 for starting of the traveling. Alternatively, the controller 23 may engage the separate clutch 16 and disengage the lock-up mechanism 15a of the torque converter 15 to thereby transmit the power of the engine 12, together with the power of the traveling motor 13 described above, to the driving wheels 11 to start the traveling. However, also in this case, the controller 23 causes the rotation speed of the engine 12 to be higher than that under control in the case of the normal state and controls the speed ratio of the transmission 14 to be a value greater than that in the case of the normal state, so as to prevent the rotation speed nMot of the motor shaft 13a from falling below the threshold vth.

Further, upon starting of the traveling in "State 3", in a case where the power of the engine 12 is to be transmitted to the driving wheels 11, the controller 23 may control the torque of the traveling motor 13 to be zero. However, also in this case, the controller 23 causes the rotation speed of the engine 12 to be higher than that under control in the case of the normal state and controls the speed ratio of the transmission 14 to be a value greater than that in the case of the normal state, so as to prevent the rotation speed nMot of the motor shaft 13a from falling below the threshold vth.

After the electric vehicle 10 starts traveling, an increase in the vehicle speed causes the driving state of the electric vehicle 10 to shift to the low-medium-speed traveling in "State 2A" or "State 2B" described above.

<Sensorless Control Process>

Figure 3:
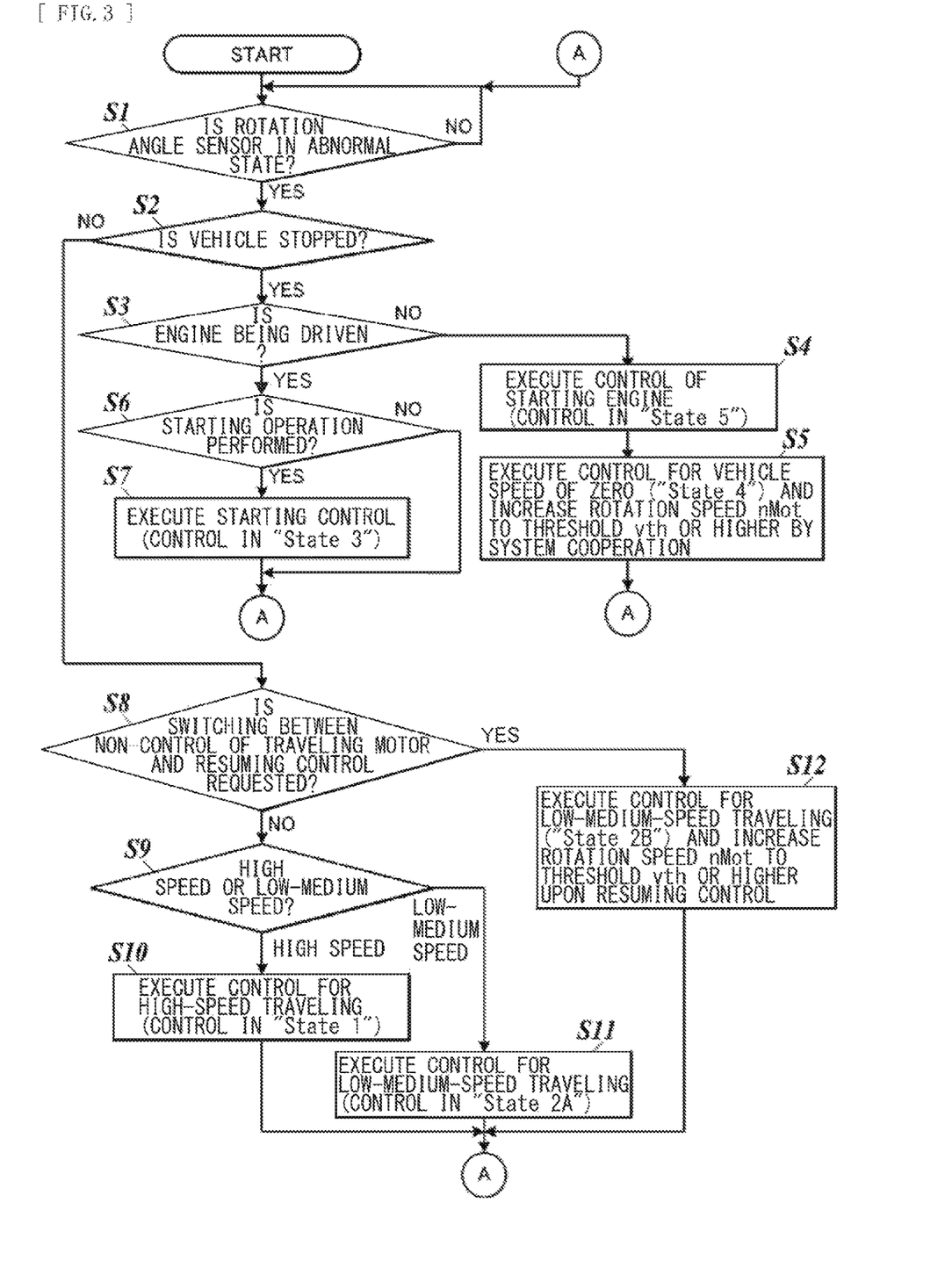
FIG. 3 is a flowchart illustrating a sensorless control process to be executed by a controller.

FIG. 3 is a flowchart illustrating a sensorless control process to be executed by the controller. "State 1" to "State 5" in the flowchart refer to "State 1" to "State 5" described with reference to Control table 2, respectively. The controller 23 starts the sensorless control process upon activation of the system of the electric vehicle 10, and continuously executes the sensorless control process while the system of the electric vehicle 10 is being activated.

When the sensorless control process is started, first, the controller 23 determines whether or not the rotation angle sensor 13s is in the abnormal state (step S1). Further, if the rotation angle sensor 13s is not in the abnormal state, the controller 23 repeatedly executes the determination in step S1. It is to be noted that another ECU different from the controller 23 may perform the check process for the rotation angle sensor 13s and the controller 23 may determine whether or not the rotation angle sensor 13s is in the abnormal state by receiving the check result from the ECU. As a method of performing checking for the rotation angle sensor 13s, for example, employed may be a method of determining whether or not a detected value of the rotation angle sensor 13s matches a predetermined condition of the abnormal state. The method of determining the abnormal state is not limited to this method and various methods may be employed.

If the result of the determination in step S1 indicates the abnormal state, the controller 23 determines whether or not the electric vehicle 10 is stopped (step S2). Here, the controller 23 may determine that the electric vehicle 10 is stopped in a case where a detected value of the vehicle speed sensor 22a that detects a rotation speed of a wheel shaft is less than or equal to a value for identifying the stopped state. The stopped state in step S2 refers to the vehicle speed of zero described in Control table 2.

If the result of the determination in step S2 indicates the stopped state, the controller 23 determines whether or not the engine 12 is being driven (step S3). If the engine 12 is found to be stopped as a result of the determination, the controller 23 executes the control of starting the engine in "State 5" (step S4). Thereafter, the controller 23 executes the control for the vehicle speed of zero in "State 4" (step S5). The engine 12 and the traveling motor 13 are driven by the processes in steps S4 and S5. Further, in the process in step S5, system cooperation allows the rotation speed nMot of the motor shaft 13a to be increased to the threshold vth or higher while allowing the rotation speed of the output shaft 14ao of the transmission 14 to be maintained at a value suitable for the driving situation of the electric vehicle 10. The system cooperation specifically refers to increasing the speed ratio of the transmission 14 in association with increasing the rotation speed of the engine 12. Thereafter, the controller 23 returns the process to step S2.

In contrast, if the result of the determination in step S3 indicates that the engine 12 is being driven, the controller 23 determines whether or not a starting operation for the electric vehicle 10 has been performed (step S6). If the starting operation is confirmed as a result of the determination, the controller 23 executes the starting control in "State 3" (step S7). By the process in step S7, the output clutch 18 is controlled to be in the half-engaged state and the electric vehicle 10 starts traveling, while the rotation speed nMot of the motor shaft 13a is maintained at the threshold vth or higher. Thereafter, or if the result of the determination in step S6 is No, the controller 23 returns the process to step S2.

If the result of the determination in step S2 described above does not indicate the stopped state of the vehicle, the controller 23 determines whether or not the non-control or resuming of the control of the traveling motor 13 is requested (step S8).

If the result of the determination in step S8 is NO, the controller 23 determines whether the vehicle speed is the high speed or the low-medium speed (step S9). If the vehicle speed is found to be the high speed as a result of the determination, the controller 23 executes the control for the high-speed traveling in "State 1" (step S10). In contrast, if the vehicle speed is the low-medium speed, the controller 23 executes the control for the low-medium speed in "State 2A" (step S11). While the controls for traveling in "State 1" and "State 2A" are performed in steps S10 and S11, respectively, the vehicle speed varies in accordance with the driving operation or the vehicle state: however, the rotation speed nMot of the motor shaft 13a is maintained at the threshold vth or higher even if the vehicle speed varies. After executing the control for predetermined control cycles in steps S10 and S11, the controller 23 returns the process to step S2.

In contrast, if the result of the determination in step S8 is YES, the controller 23 executes the control for the low-medium-speed traveling in "State 2B" (step S12). By the process in step S12, performed is a control that temporarily puts the traveling motor 13 in the non-control state and allows for traveling only with the power of the engine 12 or a control of resuming the control of the traveling motor 13.

In a case of resuming the control of the traveling motor 13 in step S12, the controller 23 increases the rotation speed nMot of the motor shaft 13a to the threshold vth or higher while maintaining the vehicle speed according to the driving operation by system cooperation. Thereafter, the controller 23 shifts to the sensorless control of the traveling motor 13 using the first estimation method. The system cooperation specifically refers to increasing the speed ratio of the transmission 14 in association with increasing the rotation speed of the engine 12. Thereafter, the controller 23 returns the process to step S2.

In a case where the rotation angle sensor 13s of the traveling motor 13 comes into the abnormal state, the control of the electric vehicle 10 described with reference to Control table 2 is achieved by the above-described sensorless control process.

A program of the above-described sensorless control process is stored in a non-transitory storage medium (non transitory computer readable medium) such as a ROM included in the controller 23. The controller 23 may be configured to read the program stored in the portable non-transitory storage medium and execute the read program. The above-described portable non-transitory storage medium may hold the program of the sensorless control process described above.

As described above, according to the drive control apparatus for the electric vehicle 10 of the embodiment, the controller 23 is able to estimate the rotation angle by the first estimation method on a condition that the rotation speed of the traveling motor 13 (the rotation speed nMot of the motor shaft 13a) is the threshold vth or higher. Further, the controller 23 is able to control the traveling motor 13 on the basis of the estimated rotation angle. Further, in a case where the rotation angle sensor 13s is in the abnormal state and where the specific driving state is present, the controller 23 controls at least one of the engine 12, the transmission 14, or the output clutch 18 in a manner different from that in the case of the normal state, to thereby maintain the rotation speed of the traveling motor 13 at the threshold vth or higher. The above-described specific driving state refers to a driving state in which the rotation speed of the traveling motor 13 is to be lower than the threshold vth if under the control in the case where the rotation angle sensor 13s is in the normal state. Accordingly, in the case where the rotation angle sensor 13s is in the abnormal state, the above-described control performed by the controller 23 increases a period in which the rotation speed of the traveling motor 13 is maintained at the threshold vth or higher, as compared with the case where the rotation angle sensor 13s is in the normal state. This increases a period in which the rotation angle is estimated by the first estimation method and the traveling motor 13 is controllable on the basis of the estimated rotation angle. Therefore, in the case where the rotation angle sensor 13s is in the abnormal state, the controller 23 is able to drive the traveling motor 13 on the basis of the result of the estimation of the rotation angle by the first estimation method allowing for highly accurate estimation at many timings. In addition, it is possible to cause the electric vehicle 10 to travel using the power of the traveling motor 13. Accordingly, even if the rotation angle sensor 13s comes into the abnormal state, transmission of the biased torque to the driving wheels 11 is reduced. As a result, it is possible to reduce the feeling of strangeness given to the passenger of the electric vehicle 10.

Specifically, in a case where the rotation angle sensor 13s is in the abnormal state, where the vehicle speed is higher than zero, and where the specific driving state is present, the controller 23 causes the rotation speed of the engine 12 to be higher than that in the case where the rotation angle sensor 13s is in the normal state (see State 2A in Control table 2). In addition, the controller 23 causes the speed ratio of the transmission 14 to be greater than that in the case where the rotation angle sensor 13s is in the normal state (see State 2A in Control table 2). Such a control makes it possible to maintain the rotation speed of the traveling motor 13 at the threshold vth or higher while maintaining the vehicle speed according to the driving operation when the vehicle is traveling.

Further, in a case where the rotation angle sensor 13s is in the abnormal state, where the vehicle speed is zero, and where the specific driving state is present, the controller 23 disengages the output clutch 18 and causes the rotation speed of the input shaft 14ai of the transmission 14 to be higher than that in the case where the rotation angle sensor 13s is in the normal state (see State 4 in Control table 2). Such a control makes it possible to increase the rotation speed of the traveling motor 13 to the threshold vth or higher without transmitting the power of the traveling motor 13 to the driving wheels 11 while the electric vehicle 10 is stopped. This suppresses transmission of the biased torque from the traveling motor 13 to the driving wheels 11. Further, thereafter, the rotation speed of the traveling motor 13 becoming the threshold vth or higher allows for driving of the traveling motor 13 by the sensorless control using the first estimation method.

Moreover, in a case where start of traveling is requested in addition while the above-described specific driving state is present, the controller 23 controls the output clutch to be in the half-engaged state (see State 3 in Control table 2). Such a control makes it possible to cause the electric vehicle 10 to start traveling while maintaining the rotation speed of the traveling motor 13 at the threshold vth or higher.

Further, according to the drive control apparatus for the electric vehicle 10 of the embodiment, the controller 23 is able to estimate the rotation angle by the second estimation method, which is executable even if the rotation speed of the traveling motor 13 is lower than the threshold vth, and to control the traveling motor 13 on the basis of the estimated rotation angle. In other words, the controller 23 is able to drive the traveling motor 13 by the sensorless control using the second estimation method. Further, in the case where the rotation angle sensor 13s is in the abnormal state, the controller 23 causes, on the basis of the request for starting the engine 12, the power for starting to be outputted from the traveling motor 13 to the engine 12 by the second estimation method while the output clutch 18 is in the disengaged state (see State 5 in Control table 2). Thus, it is possible to start the engine 12 by the power of the traveling motor 13. In addition, at that time, because the output clutch 18 is disengaged, transmission of the biased torque from the traveling motor 13 to the driving wheels 11 is suppressed. As a result, it is possible to start the engine 12 while reducing the feeling of strangeness given to the passenger of the electric vehicle 10 in the case where the rotation angle sensor 13s is in the abnormal state.

Some embodiments of the invention have been described above. However, the invention is not limited to the above-described embodiments. For example, the above-described embodiments refer to an example in which the motor shaft 13a of the traveling motor 13 is linked to the input shaft 14ai of the transmission 14 or is coupled thereto via the gear mechanism. However, the motor shaft 13a may be coupled to a power transmission shaft between the separate clutch 16 and the transmission 14, directly or via a gear mechanism. Alternatively, the motor shaft 13a may be coupled to a power transmission shaft between the engine 12 and the separate clutch 16, directly or via a gear mechanism. Moreover, in the above-described embodiments, the driving operation of the electric vehicle 10 may be performed by the driver or may be performed by an automatic driving system.

Further, the above-described embodiments refer to a configuration in which the controller 23 of the drive control apparatus directly controls the plurality of components (the accessories 31, the inverter 34, the transmission 14, the lock-up mechanism 15a, the separate clutch 16, and the output clutch 18). However, the controller 23 may be configured to control one or more of the plurality of configurations described above via another ECU by transmitting a command to the other ECU, instead of directly controlling the one or more of the plurality of configurations. In addition, the details described above in the embodiments may be appropriately changed within a range not departing from the scope of the invention.

DESCRIPTION OF REFERENCE NUMERALS

10 Electric vehicle
11 Driving wheel
12 Engine
13 Travelling motor
13a Motor shaft
13s Rotation angle sensor
14 Transmission
14ai Input shaft
14ao Output shaft
15 Torque converter
15a Lock-up mechanism
16 Separate clutch
17 Gear mechanism
18 Output clutch
21 Driving operation unit
21a Acceleration operation unit
21b Brake operation unit
21c Steering unit
21d Start operation unit
22 Sensor group
22a Vehicle speed sensor
22b Engine rotation speed sensor
22c Motor rotation speed sensor
23 Controller
31 Accessories
33 Battery
34 Inverter
nMot Rotation speed of motor shaft
vth Threshold

The invention claimed is:

1. A drive control apparatus for an electric vehicle, the drive control apparatus being to be mounted on the electric vehicle, the electric vehicle including a driving wheel, an engine that is an internal combustion engine, a traveling motor configured to generate power for traveling, a transmission configured to shift motion transmitted from the engine, and an output clutch configured to cut a path of power transmission to the driving wheel, the electric vehicle being configured to output power from the engine and the traveling motor to the driving wheel via the transmission and the output clutch, the drive control apparatus comprising:

a rotation angle sensor configured to detect a rotation angle of the traveling motor; and a controller configured to control the engine, the traveling motor, the transmission, and the output clutch, wherein the controller is configured to estimate the rotation angle by a first estimation method and control the traveling motor on a basis of the estimated rotation angle, the first estimation method being executable in a case where a rotation speed of the traveling motor is a threshold or higher, and the controller is configured to control, in a case where the rotation angle sensor is in an abnormal state and a specific driving state is present, one or more of the engine, the transmission, and the output clutch in a manner different from a manner under a control in a case where the rotation angle sensor is in a normal state, and thereby maintain the rotation speed of the traveling motor at the threshold or higher, the specific driving state being a state in which the rotation speed of the traveling motor is to be lower than the threshold under the control in the case where the rotation angle sensor is in the normal state.

2. The drive control apparatus for an electric vehicle according to claim 1, wherein, in a case where the rotation angle sensor is in the abnormal state, a vehicle speed is higher than zero, and the specific driving state is present, the controller is configured to cause a rotation speed of the engine to be higher than a rotation speed under the control in the case where the rotation angle sensor is in the normal state, and cause a speed ratio of the transmission to be greater than a speed ratio under the control in the case where the rotation angle sensor is in the normal state.

3. The drive control apparatus for an electric vehicle according to claim 2, wherein, the controller is configured to estimate the rotation angle by a second estimation method and control the traveling motor on a basis of the estimated rotation angle, the second estimation method being executable even in a case where the rotation speed of the traveling motor is lower than the threshold, and in a case where the rotation angle sensor is in the abnormal state, on a basis of a request for starting the engine, the controller is configured to cause power for starting to be outputted from the traveling motor to the engine by the second estimation method while the output clutch is in a disengaged state.

4. The drive control apparatus for an electric vehicle according to claim 1, wherein, in a case where the rotation angle sensor is in the abnormal state, the vehicle speed is zero, and the specific driving state is present, the controller is configured to disengage the output clutch and cause a rotation speed of an input shaft of the transmission to be higher than a rotation speed under the control in the case where the rotation angle sensor is in the normal state.

5. The drive control apparatus for an electric vehicle according to claim 4, wherein, in a case where the rotation angle sensor is in the abnormal state, the vehicle speed is zero, the specific driving state is present, and start of traveling is requested, the controller is configured to control the output clutch to be in a half-engaged state.

6. The drive control apparatus for an electric vehicle according to claim 5, wherein, the controller is configured to estimate the rotation angle by a second estimation method and control the traveling motor on a basis of the estimated rotation angle, the second estimation method being executable even in a case where the rotation speed of the traveling motor is lower than the threshold, and in a case where the rotation angle sensor is in the abnormal state, on a basis of a request for starting the engine, the controller is configured to cause power for starting to be outputted from the traveling motor to the engine by the second estimation method while the output clutch is in a disengaged state.

7. The drive control apparatus for an electric vehicle according to claim 4, wherein, the controller is configured to estimate the rotation angle by a second estimation method and control the traveling motor on a basis of the estimated rotation angle, the second estimation method being executable even in a case where the rotation speed of the traveling motor is lower than the threshold, and in a case where the rotation angle sensor is in the abnormal state, on a basis of a request for starting the engine, the controller is configured to cause power for starting to be outputted from the traveling motor to the engine by the second estimation method while the output clutch is in a disengaged state.

8. The drive control apparatus for an electric vehicle according to claim 1, wherein, the controller is configured to estimate the rotation angle by a second estimation method and control the traveling motor on a basis of the estimated rotation angle, the second estimation method being executable even in a case where the rotation speed of the traveling motor is lower than the threshold, and in a case where the rotation angle sensor is in the abnormal state, on a basis of a request for starting the engine, the controller is configured to cause power for starting to be outputted from the traveling motor to the engine by the second estimation method while the output clutch is in a disengaged state.

* * * * *